US006665999B1

(12) United States Patent
Dierl et al.

(10) Patent No.: US 6,665,999 B1
(45) Date of Patent: Dec. 23, 2003

(54) SEAL JAW MODULES FOR RECLOSE BAG MODIFICATION TO VERTICAL FORM, FILL, AND SEAL PACKAGING SYSTEM

(75) Inventors: Martin Bernhard Dierl, Allen, TX (US); Eduard Edwards, Arlington, TX (US)

(73) Assignee: Recot, Inc., Pleasanton, CA (US)

( * ) Notice: Subject to any disclaimer, the term of this patent is extended or adjusted under 35 U.S.C. 154(b) by 293 days.

(21) Appl. No.: 09/390,190

(22) Filed: Sep. 7, 1999

(51) Int. Cl.[7] .......................... B65B 9/20; B65B 51/14; B65B 61/18
(52) U.S. Cl. .................... 53/133.4; 53/139.4; 53/374.8; 53/552; 53/201
(58) Field of Search ................ 53/412, 133.4, 53/139.2, 552, 553, 554, 374.8, 201; 83/498, 504; 16/422; 29/278; 483/13; 493/213, 209, 214, 927; 219/768

(56) References Cited

U.S. PATENT DOCUMENTS

| | | | |
|---|---|---|---|
| 1,529,518 A | * 3/1925 | Voeller | 29/278 |
| 2,999,532 A | * 9/1961 | Bursak | 53/552 |
| 3,438,173 A | 4/1969 | Omori | |
| 3,538,676 A | * 11/1970 | Runo | 53/552 |
| 3,561,504 A | 2/1971 | Tanner | |
| 3,616,087 A | 10/1971 | Henry | |
| 3,678,562 A | * 7/1972 | Leibinger | 483/28 |
| 3,685,250 A | 8/1972 | Henry | |
| 3,779,836 A | 12/1973 | Henry | |
| 3,874,976 A | * 4/1975 | MacFarland | 53/552 |
| 4,353,196 A | * 10/1982 | Beer | 53/451 |
| 4,485,549 A | * 12/1984 | Brolund | 483/28 |
| 4,909,017 A | * 3/1990 | McMahon | 53/133.4 |
| 5,016,426 A | * 5/1991 | Davis | 53/554 |
| 5,111,643 A | 5/1992 | Hobock | |
| 5,284,002 A | 2/1994 | Fowler et al. | |
| 5,511,363 A | * 4/1996 | Doede | 53/552 |
| 5,519,982 A | * 5/1996 | Herber | 53/412 |
| 5,592,802 A | * 1/1997 | Malin | 53/133.4 |
| 5,768,852 A | 6/1998 | Terminella et al. | |
| 5,794,997 A | * 8/1998 | Lewton, Jr. | 29/278 |
| 5,816,018 A | * 10/1998 | Bois | 53/133.4 |
| 6,000,197 A | * 12/1999 | Ausnit | 53/412 |

* cited by examiner

Primary Examiner—John Sipos
(74) Attorney, Agent, or Firm—Colin P. Cahoon; Carstens, Yee & Cahoon, L.L.P.

(57) ABSTRACT

A self-aligning zipper seal module adapted for quick change-out in a sealing carriage. The zipper seal module allows for a quick modification of a sealing carriage in order to accommodate different package dimensions. The module is stored and is installed in a closed and aligned position by use of an aligning handle. The module is easily installed or removed with a single tool and is designed to reduce the potential for operator injury by isolation from heat sources and by virtue of the aligning handle. The various seal facings of the module are oriented to equalize pressure on the facings during sealing and increase stripping efficiency. The zipper seal facings incorporate a novel insert design, thereby eliminating the need for stocking different sized facings to accommodate various bag widths. A return module of similar design is used to quickly return the sealing carriage to a standard configuration.

33 Claims, 10 Drawing Sheets

SEAL JAW MODULES FOR RECLOSE BAG MODIFICATION TO VERTICAL FORM, FILL, AND SEAL PACKAGING SYSTEM

BACKGROUND OF THE INVENTION

1. Technical Field

The present invention relates to a reclose or zipper seal jaw design for use in a sealing carriage of a vertical form and fill packaging machine, and, in particular, to a quick-change, reclosable zipper seal jaw module and standard or "return" module that can accommodate variable bag sizes. The modules are self-aligning, easily installed on existing bridge assembly hardware, and incorporate several safety enhancements.

2. Description of Related Art

Vertical form, fill, and seal packaging machines are commonly used in the snack food industry for forming, filling, and sealing bags of chips and other like products. Such packaging machines take a packaging film, such as polypropylene, from a sheet roll of said film, and forms the film into a vertical tube around a product delivery cylinder. The vertical tube is vertically sealed along its length to form a back seal. The machine applies a pair of heat-sealing jaws or facings against the tube to form a transverse seal. This transverse seal acts as the top seal on the bag below and the bottom seal on the package being filled and formed above. After the seal has been formed, the film tube is pushed downward to draw out another package length. The package below the transverse seal is separated by cutting across the sealed area.

Before each transverse seal is formed by the sealing jaws, the product to be packaged is dropped through the product delivery cylinder and formed tube and is held within the tube above the bottom transverse seal. Prior to forming the upper transverse seal, the sealing jaws are brought together in two steps. First, a pair of stripping plates or bars are brought into contact with the film in order to flatten the tube and strip product out of the area to be sealed. Second, the final closing movement of the jaws is performed, thereby forming the transverse seal.

Figure 1A:
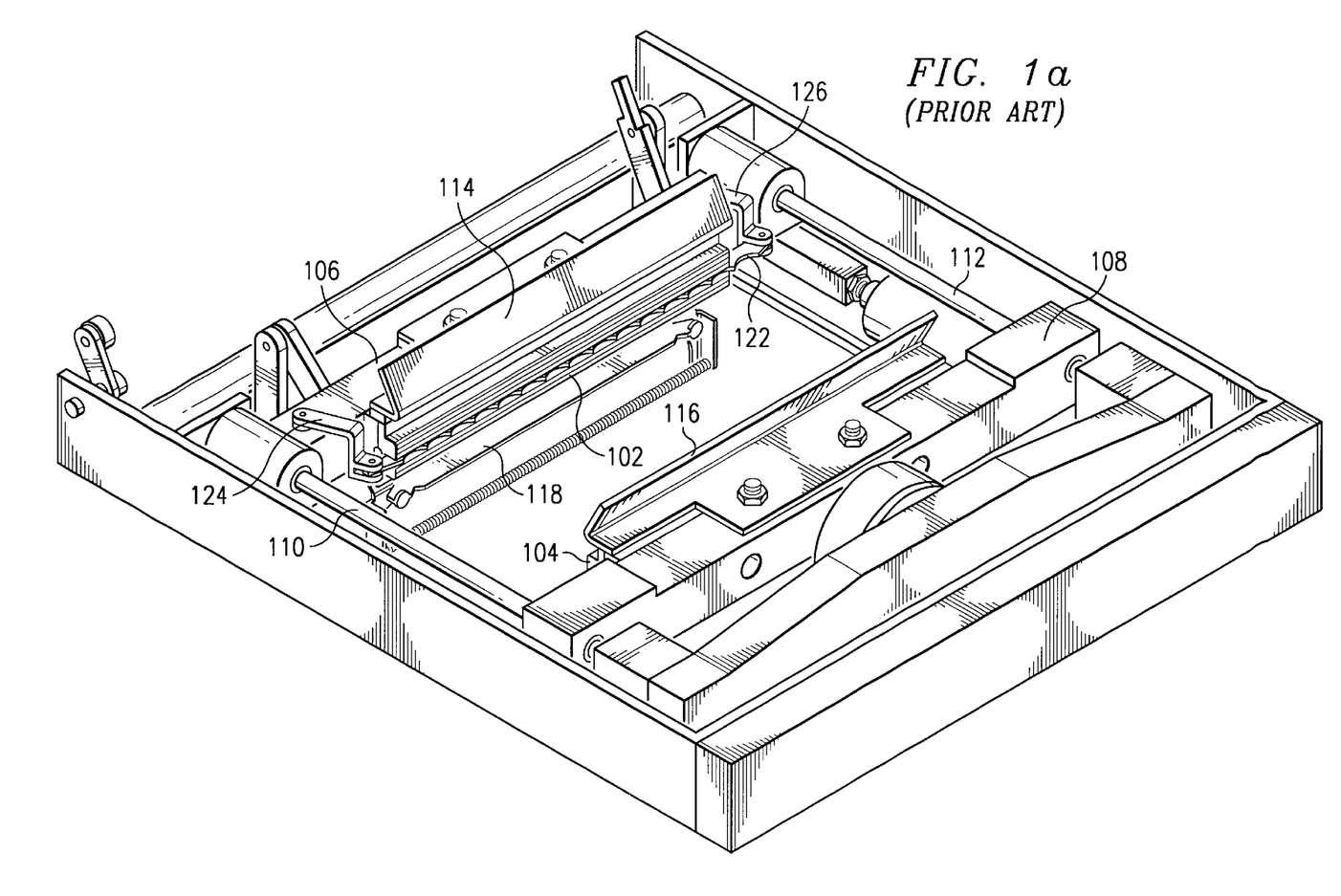
FIG. 1a is a perspective view in elevation of a prior art sealing carriage.
Figure 1B:
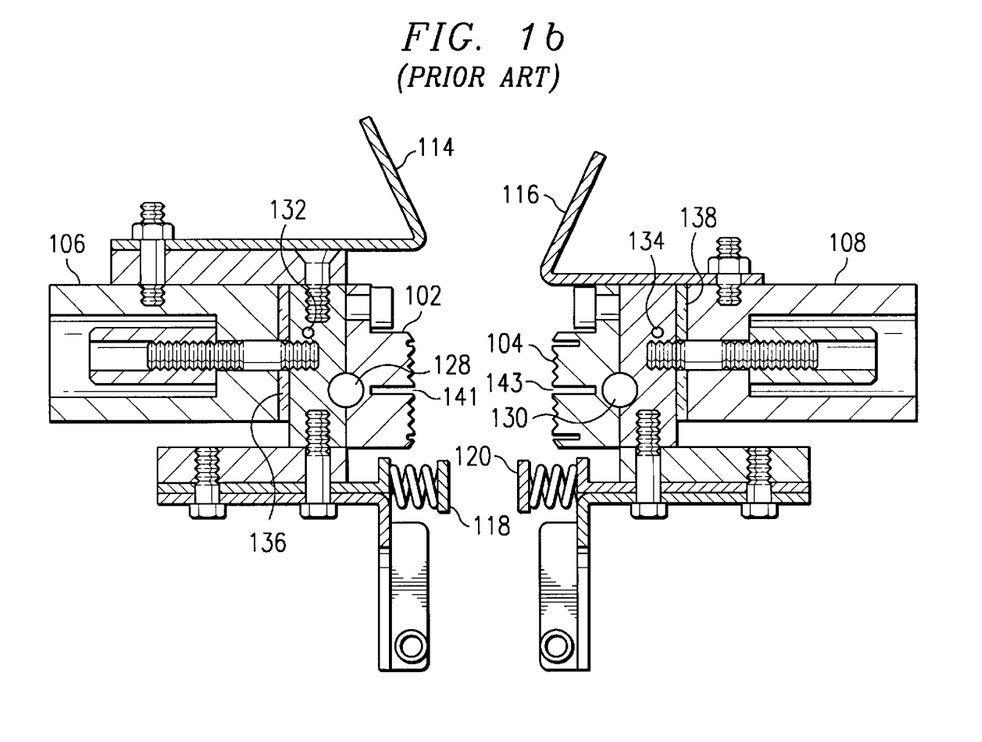
FIG. 1b is a cross-section of a prior art facing assembly.

The bag sealing functions of a vertical form, fill, and seal machine are best described with reference to FIGS. 1*a* and 1*b*. FIG. 1*a* shows a sealing carriage on a prior art form, fill, and seal packaging machine. FIG. 1*b* is a cross-section of a prior art facing assembly installed in said carriage. Opposed transverse seal jaw facings 102, 104 (hereinafter referred to by Applicants as "jaw facings") are shown attached to opposed bridge assemblies 106, 108. Behind each jaw facing 102, 104 is a heat probe 128, 130 capable of heating the exposed surface of the jaw facings up to 405° F. during operation. Placed between the jaw facings 102, 104 and their respective bridge assemblies 106, 108 is a heat separator 136, 138. The heat separators 136, 138 provide a thermal barrier between the jaw facings 102, 104 and the bridge assembly 106, 108 in order to minimize heat transfer to the bridge assembly 106, 108 and other components attached thereto. A thermocouple or thermoster 132, 134 is placed between the heat separator 136, 138 and the heat probe 128, 130 in order to monitor the jaw facing 102, 104 temperature. As previously described, a transverse seal is formed when a tube of film placed between the jaw facings 102, 104 is flattened as the jaw facings 102, 104 are brought in close proximity to each other. This is accomplished by both bridge assemblies 106, 108 traversing towards each other while riding on two stationary rods 110, 112.

Also shown attached to the bridge assemblies 106, 108 are a pair of opposed crumb plates 114, 116. When the bridge assemblies 106, 108 are brought together, the crumb plates 114, 116 slightly overlap, thereby forming a temporary "S" shaped constriction in the flattened film tube. This "S" shaped constriction provides a means for keeping product out of the transverse seal area while the tube of film above the constriction is filled with product. Two stripper bars 118, 120 are also shown attached to the bridge assemblies 106, 108. The stripper bars 118, 120 are typically spring loaded and provide the stripping function previously described.

Both of the jaw facings 102, 104 are constructed with a central channel 141, 143 to accommodate a knife or cutting tool 122. This knife 122 is recessed within the channel 141 of one of the jaw facings 102 and held in place by two knife brackets 124, 126 attached to the bridge assemblies 106, 108. After the transverse seal has been formed on the flattened film tube, the knife brackets 124, 126 are rotated slightly, thereby exposing the knife 122 to the transverse seal. This action cuts the transverse seal, thereby completing the process of forming, filling, and sealing a single package.

The prior art carriage described above is designed such that the jaw facings 102, 104 can be removed in order to install jaw facings 102, 104 that provide for different vertical widths of the resultant transverse seals. The facing assembly shown in FIG. 1*b* is aligned at the factory, and removal from the sealing carriage by the operator of more than the jaw facings 102, 104, crumb plates 114, 116, and stripper bars 118, 120 is not recommended. Such design is also not easily adapted to the formation of a zipper seal along with the standard transverse seal. In fact, as will be explained below, a form, fill, and seal packaging system must be substantially modified when it is used to install a zipper seal at the top of the package.

A zipper seal is a resealable barrier that can be installed on the top end of a bag either immediately below or above the upper transverse seal. After the consumer breaks the upper transverse seal to gain access to the product within the package, the zipper seal can be reclosed, thereby keeping the product fresh. Such package is referred to as a "reclose" bag. Consequently, the terms "zipper seal module" and "reclose module," and many other descriptive terms using as adjectives the words "zipper" or "reclose," are used herein by Applicants interchangeably.

Figures 2A, 2B:
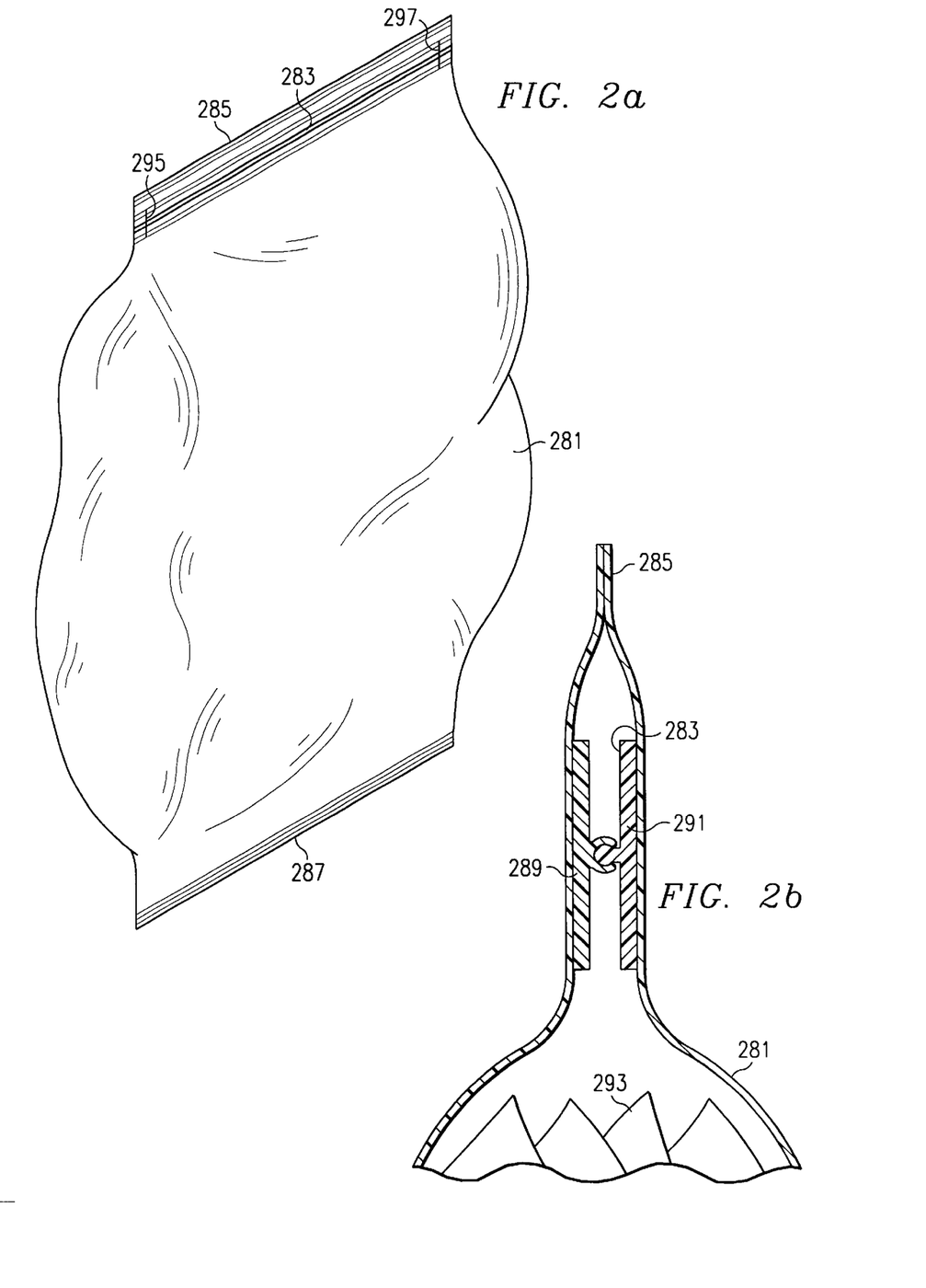
FIG. 2a is a perspective representation of a food package incorporating a zipper seal.
FIG. 2b is a cross-section of the top portion of a food package incorporating a zipper seal.

FIGS. 2*a* and 2*b* show one embodiment of a reclose food package 281 incorporating a zipper seal 283. FIG. 2*a* is a perspective view of a flexible, plastic package or bag 281 used to contain potato chips, tortilla chips, and the like. FIG. 2*b* is a cross-section of the top of said bag 281. The food package 281 shown is typical in that it has an upper transverse seal 285 and a lower transverse seal 287. However, this bag also uniquely incorporates a zipper or reclose seal 283 immediately below the upper transverse seal 285. The zipper seal 283 is made up of a male engagement member 291 and a female engagement member 289.

For the embodiment illustrated, the package 281 is opened for the first time by pulling on the exterior walls of the package 281 below the zipper seal 283. The two opposed members 289, 291 separate, thereby opening the zipper seal 283. Stress can then be exerted on the upper transverse seal 285 until it opens. Once this occurs, the package 281 is fully opened and the product, such as tortilla chips 293, may be consumed. The package 281 can then be resealed by applying pressure to the exterior of the package 281 along the zipper seal 283, thereby forcing the male engagement member 291 back into the female engagement member 289. This novel reclose bag design is described in detail in U.S. patent application Ser. No. 09/079,382 filed on May 15, 1998 now U.S. Pat. No. 5,972,386.

When making the reclose bag 281 illustrated, the opposed members 289, 291 (of the zipper seal 283) must be heat sealed to the inside surface of the food package 281. Further, these opposed members 289, 291 must be heat-sealed together at each end 295, 297. This is accomplished by applying a heat and pressure sealing device to an outer areas of the zipper seal 283.

The film that enters a form and fill machine to form the reclose package 281 shown in FIG. 2a is typically a continuous sheet with graphics presented on one side. The side of the sheet on which the graphics are presented will ultimately comprise the outside of the package 281. The unprinted side of the sheet will ultimately comprise the inside of the package 281. Prior to entering the form and fill machine, zipper seals 283 must be attached to the inside film surface by securing one of the opposed members 289, 291 on the inside surface of the film with the zipper seal 283 in the closed configuration position. The zipper seal 283 thus secured should be oriented such that when the upper transverse seal 285 is formed on the package 281, the zipper seal 283 is located in its proper position below and parallel to the upper transverse seal 285. This will allow for the formation of both the transverse seal 285 and the permanent attachment of the zipper seal 283 to the inside of the package 281. The simultaneous formation of the transverse seal 285 and the installation of the zipper seal 283 can be accomplished with an extensively modified prior art sealing carriage, in part by installing a second set of facings for sealing the zipper seal into the package along with the existing set of facings. As will be described, such adaptation of an existing form and fill sealing carriage makes for a number of technical difficulties and unsatisfactory results.

Figure 3A:
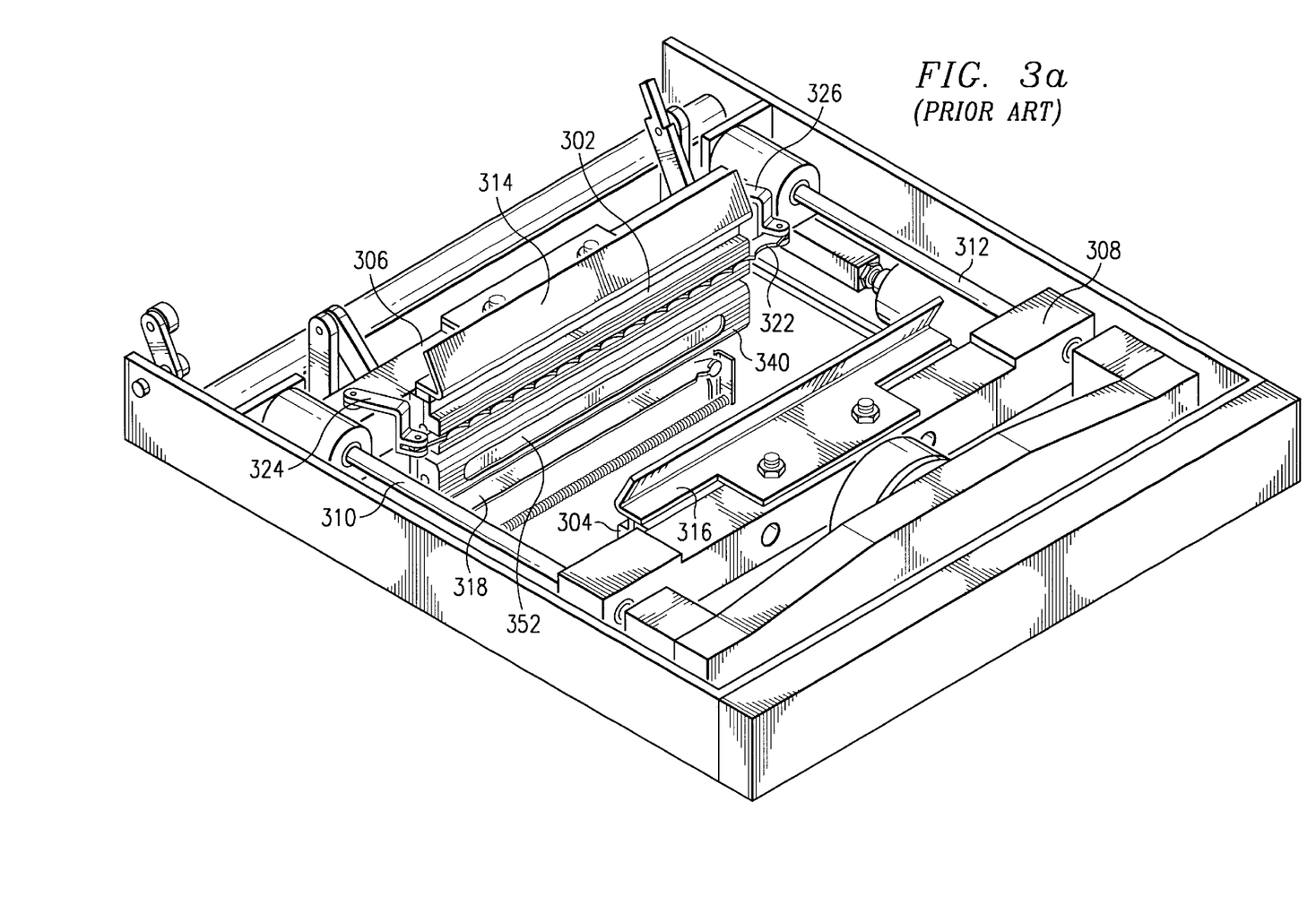
FIG. 3a is a perspective view in elevation of a prior art modification to a sealing carriage to accommodate a reclose configuration.
Figure 3B:
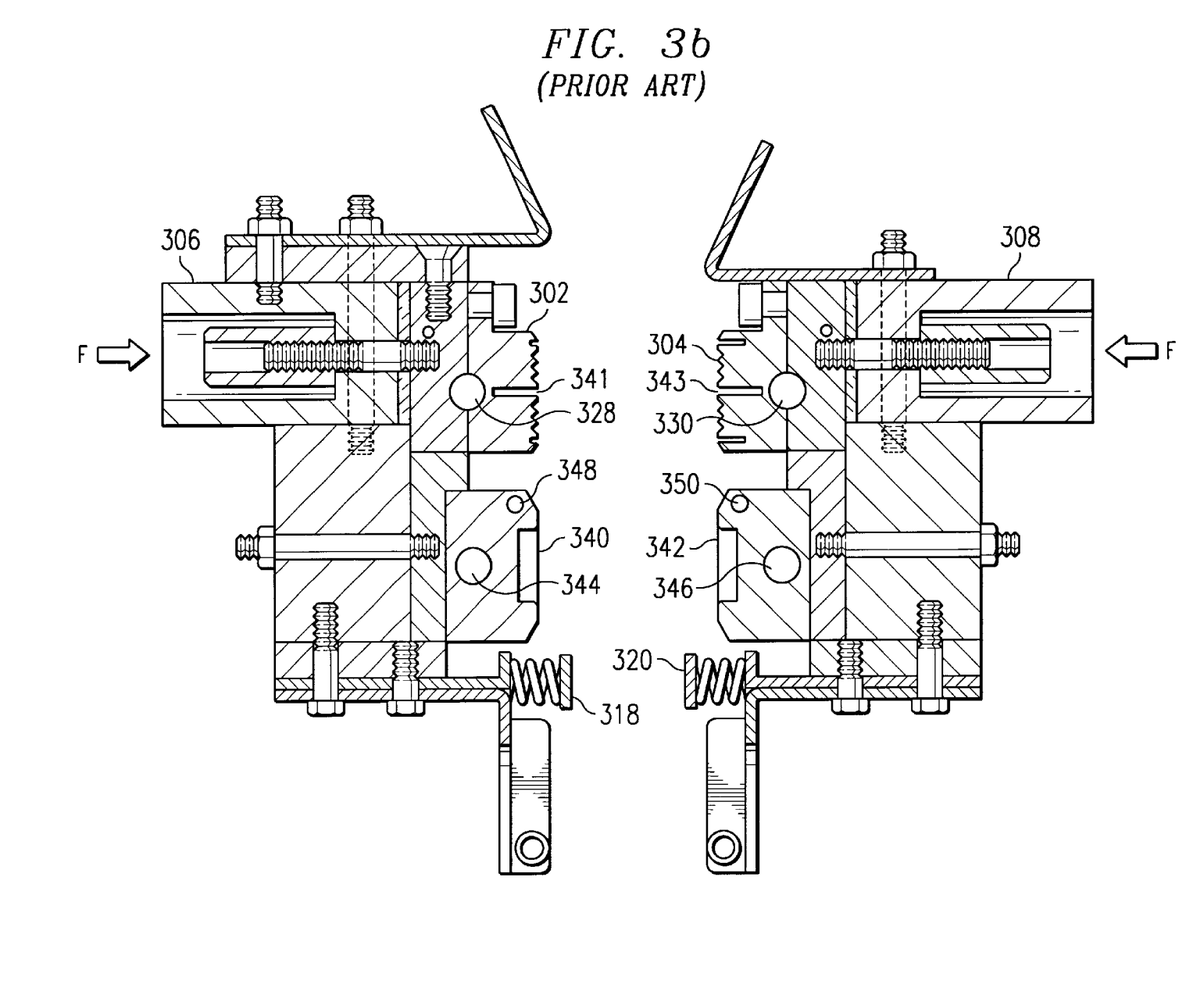
FIG. 3b is a cross-section of a prior art modification to a facing assembly to accommodate a reclose configuration.

FIGS. 3a and 3b illustrate one prior art embodiment known to Applicants of a modification of a sealing carriage to accommodate the formation of a reclose bag. FIG. 3a is a perspective view of a modified sealing carriage, while FIG. 3b is a cross-section of the modified facing assembly. By comparing FIGS. 3a and 3b with FIGS. 1a and 1b, it is evident that a second set of opposed facings 340, 342 have been installed below the first opposed set of facings 302, 304. The second set of opposed facings 340, 342 are the means for sealing the zipper below the transverse seal on the reclose bag. Consequently, they are known as zipper seal jaw facings 340, 342 and referred to herein by Applicants as "zipper seal facings." The stripper bars 318, 320 are now attached below the zipper seal facings 340, 342. Each of the zipper seal facings 340, 342 must also have a respective heat probe 344, 346 and thermosters 348, 350.

Prior art modifications to the sealing carriage of a form and fill packaging system to accommodate the manufacture of reclose bags are not easily installed, have exhibited poor performance characteristics, raise several safety concerns, and are only suitable for one package size and zipper configuration. Consequently, the modification shown in FIGS. 3a and 3b is not a desirable fix. As will be explained, the purchase of a dedicated form and fill machine only capable of constructing reclose bags is also not an acceptable alternative.

By way of background, most chip packaging facilities have on-site one to several (and perhaps as many as seven or eight) vertical form, fill, and seal packaging machines. A single packaging facility might be required in any given week to package several different product lines in numerous different bag sizes for each product line by using the same form and fill packaging machines. Each form and fill packaging machine is quite expensive, for example, in the range of $50,000 to $150,000, and represents a large capital investment. Consequently, it is critical to the economic efficiency of the packaging facility that each form and fill machine be capable of being quickly adapted to handle a variety of bag widths and lengths. This is easily done with the prior art vertical form, fill, and seal machine discussed herein for standard (non-reclose) bags. The facings 102, 104 (shown in FIG. 1a) can accommodate any required bag width up to the total width of the facings 102, 104. The bag length is easily adjusted by changing the amount of film travel below the facings 102, 104. However, converting a prior art vertical form, fill, and seal machine from the configuration shown in FIGS. 1a and 1b to the configuration shown in FIGS. 3a and 3b requires extensive modifications to the machine to allow for additional attaching points, electrical connections, controls, and to accommodate additional stripper travel. Once these modifications are made, it typically takes several hours to install the additional set of facings and accompanying heat probes, stripper plates, and other required items. It then takes an additional several hours to reconvert the assembly back to a standard transverse seal configuration.

It is expected that a typical packaging facility will only need to dedicate a small portion of the packaging assets to the formation of reclose bags incorporating zipper seals. Consequently, a permanent changeover to a reclose bag configuration or the use of a specifically built reclose bag machine would result in such packaging machine sitting idle for long periods of time. The ability to quickly change over from a standard transverse seal configuration to a reclose configuration is, therefore, a major consideration. The present down-time involved in changing from one configuration back to the other, which is in excess of several hours, adds considerably to the labor costs in running reclose bags and reduces the overall packaging capacity of any single packaging facility.

Along the same lines, prior art reclose designs allow for the production of only one bag width for any given set of zipper seal facings 340, 342. This is due to the fact that the zipper seal facings 340, 342 have a rectangular shaped recess in order to accommodate the zipper seal while at the same time sealing the zipper seal at each end and around its edges to the inside of the bag. If a change in bag size is required for a reclose bag, the zipper seal facings 340, 342 must be removed from the reclose assembly and replaced with a new zipper seal facing 340, 342 to accommodate the new bag's width. This again takes two to four hours to accomplish, thereby requiring additional man hours and reducing the efficiency of the packaging facility. The zipper seal facings 340, 342 are also expensive items, presently costing approximately $7,500.00 per each set of facings 340, 342. Capital investment must therefore be made for every conceivable bag width so that a specific sized zipper seal facing 340, 342 can be on hand whenever a corresponding bag width needs to be run on the form and fill machine in the reclose configuration.

The need to replace components on the modified carriage and facing assemblies shown in FIGS. 3a and 3b increases the safety hazards involved in such change over operation. In order to remove or install the zipper facings 340, 342 and related components, it is necessary to bring the carriage to the open position. An inadvertent activation of the closing feature of the carriage while an operator is attempting to remove or install a component could result in serious injury. Further, during operation the various facings 302, 304, 340, 342 are heated to 350° F. In order to remove the facings 302, 304, 340, 342 after operation, they must either be allowed to cool or careful attention must be paid to insure that the operator is not burned by the facings 302, 304, 340, 342 or accompanying heat probes 328, 330, 344, 346. The cutting knife 122 is also extremely sharp and must be carefully removed.

The placement of the zipper seal facing 340, 342 below the standard jaw facing 302, 304 also introduces several problems. It can be seen from FIGS. 2b and 3b that the area that is required to be stripped of product prior to applying both a standard transverse seal and a reclose seal is approximately doubled in length compared to the area that requires stripping when only a transverse seal is formed. More importantly, with the zipper seal 283 located below the transverse seal 285, the zipper seal 283b is closest to the product and will always have to be stripped even if portions of the transverse seal 285 do not require stripping. This is problematic in that the zipper seal 283 is significantly thicker than the transverse seal 285. Effective stripping widths for a transverse seal 285 are on the order of 0.030 inches, while effective stripping widths for a zipper seal 283 are on the order of 0.125 inches. Consequently, stripping efficiency of the transverse seal area is lost because the strippers must be set to accommodate the thicker zipper seal 283 located below. Further, the chassis or frame of the form and fill machine must be modified to allow space for stripping in light of the addition of components below the existing facings and accompanying stripper bars. The alternative is to limit the amount of stripping travel, which in turn limits the ability to remove product from the sealing areas.

It is also evident that the zipper seal facings 340, 342, unlike the jaw facings 302, 304, are not centered along the axis of the closing force acting on the carriage. FIG. 3b shows two force vectors F indicating that the force exerted on the assembly is centered along the axis of travel of bridge assemblies 306, 308 along the stationary rods 310, 312. These force vectors typically produce a pressure of 1000 to 1200 psi along the facings 302, 304 during seal formation. However, the rigidity of the facing assembly shown in FIG. 3b is not sufficient to equally distribute this pressure because of the cantilevered location of the zipper seal facings 340, 342 away from the centerline of the supporting bridge assemblies 306, 308. The zipper seal facings 340, 342 act as lever arms rotating away from the force F centered on the bridge assemblies 306, 308. Unless this phenomena is counteracted, sufficient pressure cannot be applied on the zipper seal to adequately and uniformly attach it to the inside of the bag. A prior art fix to this problem is to install springs (not shown) behind the zipper seal facings 340, 342 in order to counteract the rotating effect. This fix has been demonstrated to reduce the overall pressure applied by the carriage assembly on the bag film. To counteract this loss of pressure, the heat or the dwell time must be increased, or both. Increasing the dwell time reduces the productivity of the bag maker, while heat can only be increased to a certain level before other adverse consequences are experienced.

Consequently, a need exists for a modular zipper seal jaw unit that can be easily removed from or installed on a prior art form and fill packaging machine sealing carriage, thereby quickly modifying the sealing carriage for a reclose configuration. This zipper seal jaw module should incorporate safety features to keep the operator away from heat sources and should physically lock in the closed position in order to avoid inadvertent closure of the device on the operator's hands during removal or installation. Ideally, the module should be self-aligning and quickly installable with a minimal number of tools. The module design should allow for a uniform application of pressure during the sealing mode between the jaw facings and the zipper seal facings. Further, the orientation of the module should allow for no interference with the form and fill machine chassis during stripping and promote increased stripping efficiency. A single module should be easily convertible to handle any width reclose bag without the need to stock and replace various sizes of zipper facings. The invention should also incorporate a standard return module that can be quickly and easily substituted for the reclose module to return the form and fill package machine to standard transverse seal operation.

SUMMARY OF THE INVENTION

The proposed invention comprises a quick-change zipper seal jaw module and accompanying return module that are self-aligning and easily installed in less than fifteen minutes with a single standard tool. The zipper seal module uses two rigid support members to support an opposed pair of zipper seal facings and an opposed pair of jaw facings. The support members can also support crumb plates and stripper bars, as needed. Each support member is easily attached to an existing bridge assembly with one or more bolts. Each support member also has at least one threaded receiver for receiving a bolt from an aligning tool. This aligning tool holds the opposed facings together in an aligned position when the module is being installed, removed, or while in storage. The heating requirements of the module are completely self-contained and connected to electrical quick-connect plugs which mate with quick-connect outlets installed on the chassis of the form and fill machine.

The zipper facings are located above the jaw facings in one embodiment of the invention. This requires that the package film be run upside-down, but also increases stripping efficiency, since the thicker zipper seal is located further from the product level in the bag during sealing. Further, the zipper seal facings and jaw facings are oriented such that the pressure applied on the module by the bridge assemblies during a sealing step is generally distributed equally about all facing contact surfaces. A knife adapter is provided to move the location of the knife to the repositioned jaw facings.

In one embodiment of the invention, the zipper seal facing is constructed of a slotted channel that allows for the installation of end inserts. This allows for the same zipper facing to be used to make varying widths of reclose bags by merely changing the size of the end inserts or moving the inserts relative to each other within the slotted channel.

The invention also provides for a "return" module which returns the vertical form, fill, and seal machine to a standard transverse seal configuration using the same mounting hardware as used with the reclose or zipper seal module. The return module is also self-aligning by use of an alignment handle.

The invention is a great improvement over the prior art for a number of reasons. The time involved in changing a form and fill machine from a standard transverse seal configuration to a reclose configuration has been reduced from several hours to less than 15 minutes. A similar time saving is involved when adjusting the zipper seal facing of the invention for varying bag widths since the zipper seal facing need not be removed. This feature also saves a considerable amount of capital investment, since changing a reclose bag width does not require the use of a different, and expensive, size jaw facing.

The use of an aligning handle with both the reclose module and return module greatly increases safety during change-over operations and when required maintenance must be performed. Since the module is completely self-contained, maintenance on heat probes, thermosters, and other module components can be done off-line and away from the potential crushing hazards associated with working on sealing carriage components while the sealing carriage is in the open position. Changing facings can also be done off-line. The modular installation and removal using the aligning handle is done with the sealing carriage in the closed position, thereby keeping an operator away from hot components immediately after operation and reducing the chance of the facings inadvertently closing on an operator's hand.

The invention performs the sealing function more efficiently than prior art designs and increases stripping efficiency due to the reversed and centered relative orientation of the jaw facings and zipper seal facings. Normal dwell times and temperatures can be used while still producing uniform and acceptable transverse seals and zipper seals. The orientation of the facings centered on the bridge assembly also adds minimally to the vertical space required below the bridge assemblies to accommodate stripping travel. Therefore, the modules do not interfere with an existing form and fill machine chassis during the stripping phase of package formation.

The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 4A:
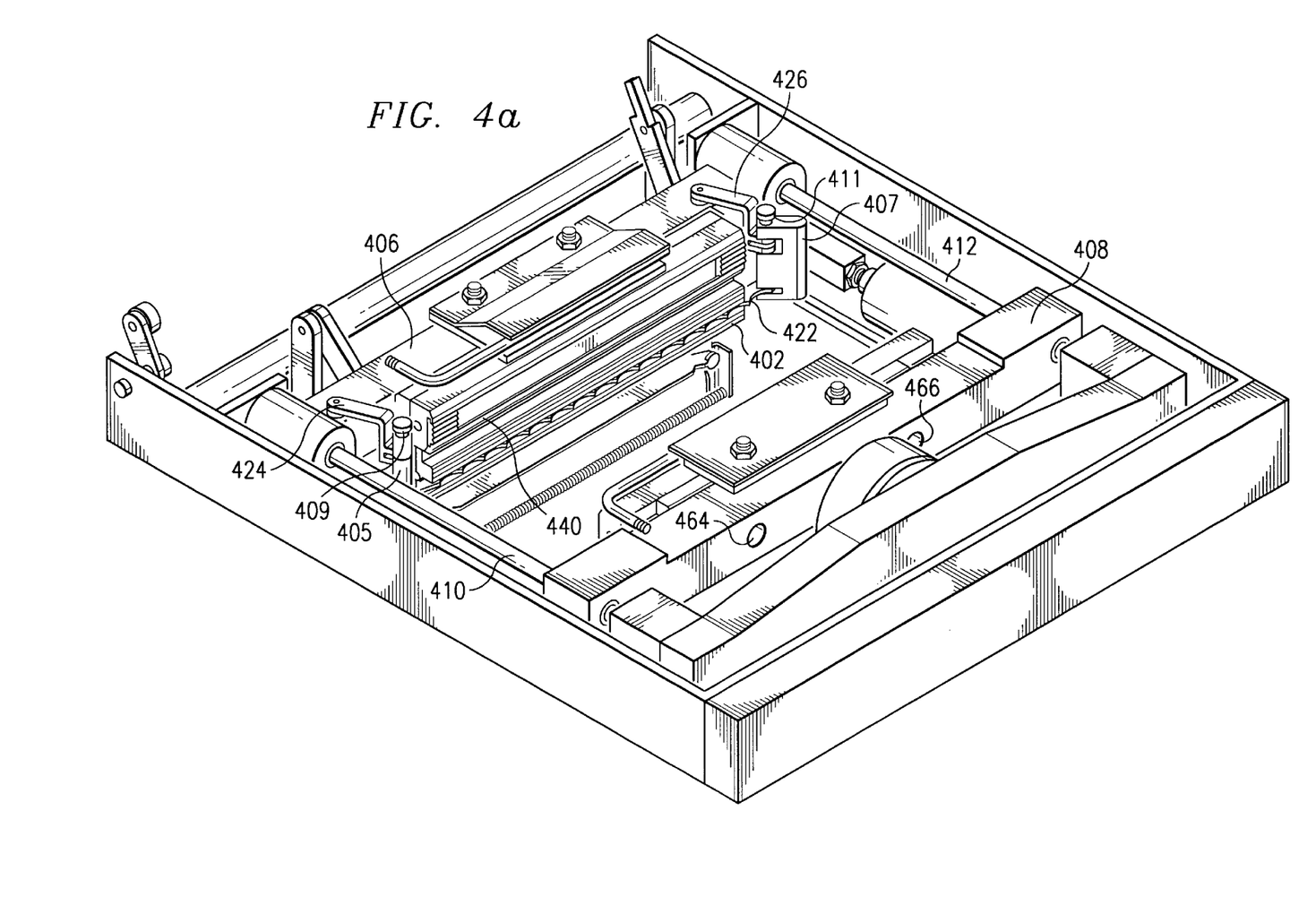
FIG. 4a is a perspective view in elevation of the reclose module of the present invention installed on a prior art sealing carriage.
Figure 4B:
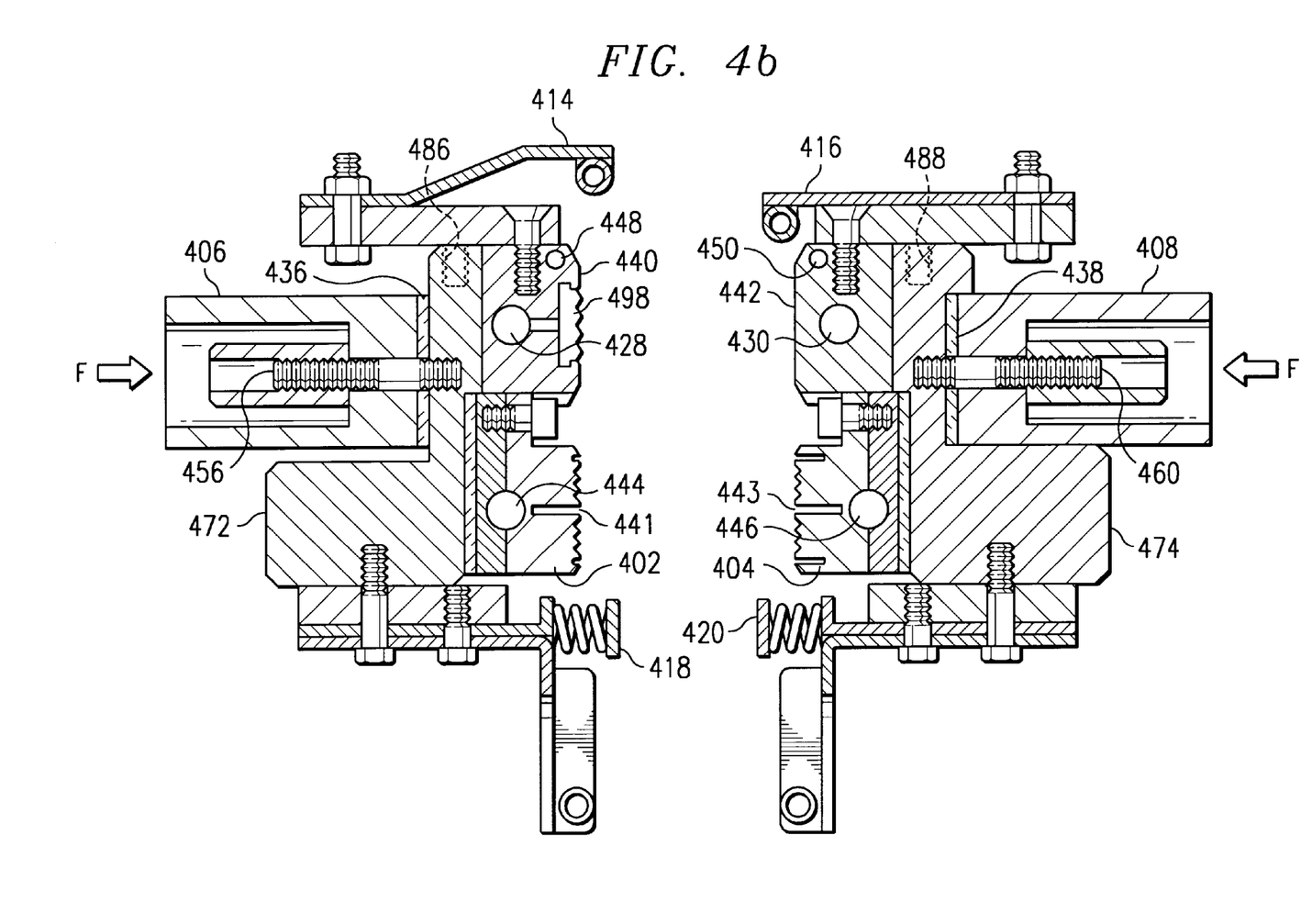
FIG. 4b is a cross-section of the reclose module of the present invention.

FIGS. 4a and 4b illustrate one preferred embodiment of the reclose module of the present invention. FIG. 4a is a perspective view of the reclose module installed in a prior art sealing carriage, while FIG. 4b is a cross-section of the reclose module in position on the bridge assemblies 406, 408 without the aligning handle installed, which handle will be described in further detail below.

The reclose module is self-contained comprising many of the individual components which together make up the prior art modification embodiment shown in FIGS. 3a and 3b. With reference to FIG. 4b, included within the reclose module are a pair of opposed jaw facings 402, 404, a pair of opposed zipper seal facings 440, 442, heat probes 428, 430, 444, 446, thermosters 448, 450, heat barriers 436, 438, crumb plates 414, 416, and stripper bars 418, 420.

Figure 5:
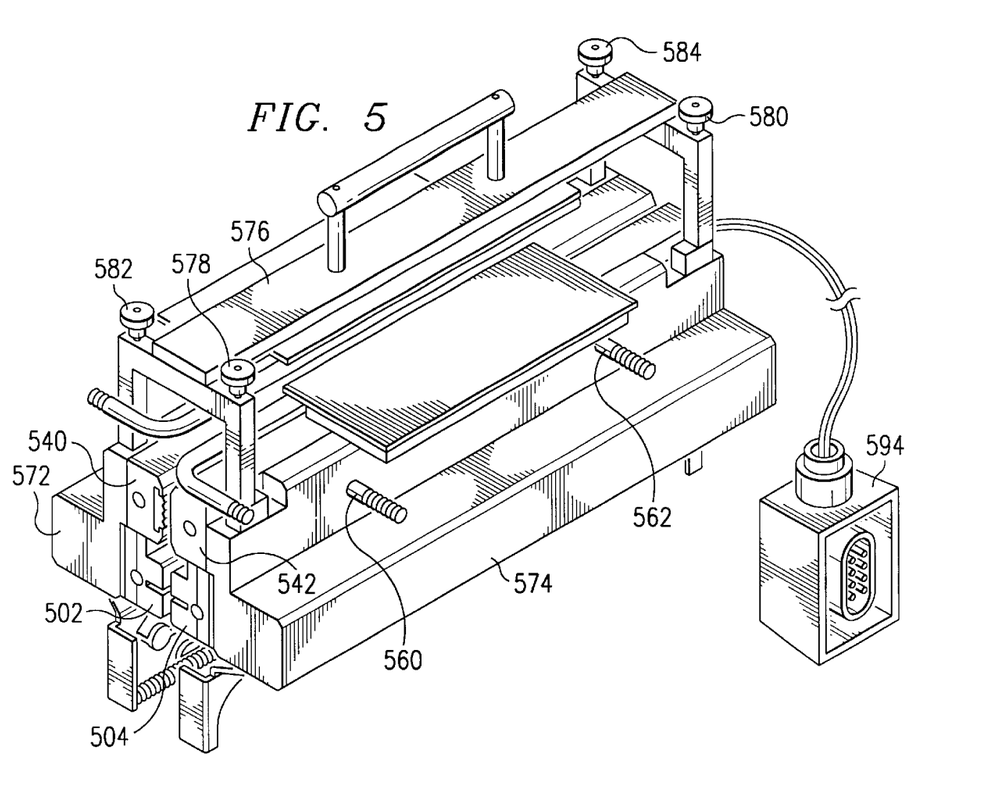
FIG. 5 is a perspective view in elevation of the reclose module of the present invention with an aligning handle installed.

The module itself is mounted onto the sealing carriage at the bridge assemblies 406, 408 by four installation bolts 456, 460, two of which are shown in the cross-sectional view of FIG. 4b. Two nut wells 464, 466 visible on FIG. 4a provide access to these bolts 460 and show the relative position of the bolts 460 along the length of a bridge assembly 408. (FIG. 5 shows the two installation bolts 560, 562 that would be received by the nut wells 464, 466 shown on FIG. 4a). Since installation of the entire module onto the bridge assemblies 406, 408 is accomplished by tightening four uniform nuts on four bolts 456, 460, a single socket wrench is the only tool required in changing over from a return module (which will be described below) and the reclose module, and vice versa.

The relative vertical positioning of the facings pairs 402, 404, 440, 442 (the jaw facings 402, 404 and the zipper seal facings 440, 442 are both referred to by Applicants generically as "facings") have been reversed in the preferred embodiment illustrated. The zipper seal facings 440, 442 are now located above the jaw facings 402, 404. This embodiment is preferred because it reduces the need to strip through the thicker zipper seal area on the bag. By reversing the facings 402, 404, 440, 442 relative to their vertical orientation, the zipper seal and the transverse seals can be made first before the bag is filled from what will become the bottom of the bag. With the bag being filled inverted, the area most likely requiring stripping is the transverse seal area, since it is located closest to the product level in a filled bag. Consequently, the stripping gap can be set narrowly in order to efficiently strip this area. The only other adjustment required is that the packaging film must be run upside-down through the form and fill machine.

Another distinct advantage of the present invention over the prior art is the added rigidity of the module and the centering of the pressure transmitted to the facings 402, 404, 440, 442 by the force vectors F acting on the bridge assemblies 406, 408. First, all of the various components that make up the reclose module are mounted on or supported by two support members 472, 474. Each support member 472, 474 is extremely rigid and made from a contiguous piece of metal or other suitable material such as hardened steel. The front support member 474 (referenced, like all other components referred to by Applicants as "front" or "rear," from its position on the sealing carriage while viewed by an operator) is constructed to provide a snug fit about the front bridge assembly 408. The rear support member 472 must have some tolerance in its fit with the rear bridge assembly 406 in order to accommodate the auto-aligning feature of the invention which will be described below. Second, the zipper seal facings 440, 442 and jaw facings 402, 404 have also been re-oriented so that they are more centrally aligned with the force vectors F acting on the bridge assemblies 406, 408. This alignment with the force vectors F combined with the rigidity provided by the design of the support members 472, 474 resolves the pressure loss problem of prior art designs whereby the prior art zipper seal facings tend to deflect away from the package film during sealing. Consequently, the present invention provides for an even distribution of pressure about the zipper facings 440, 442, and the jaw facings 402, 404. This in turn allows the form and fill machine to operate at shorter dwell times and standard temperatures.

Figure 6:
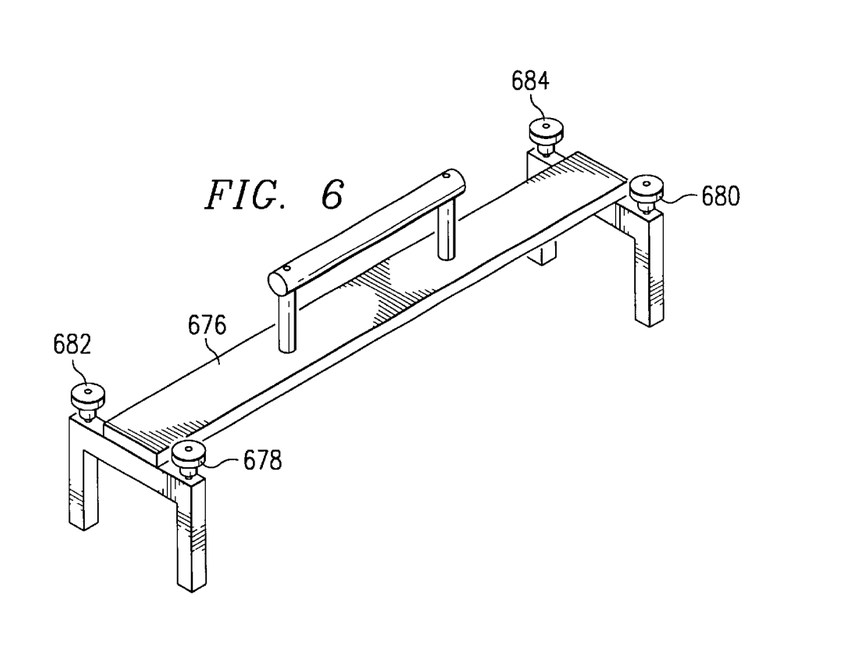
FIG. 6 is a perspective view in elevation of the aligning handle of the present invention.

As noted previously, prior art reclose facing assembly designs do not allow for removal of components from the bridge assemblies, as the alignment of the facing is factory set. Consequently, most repair work that must be done on the prior art facing assembly, such as the replacement of heat probes or thermosters, must take place with the prior art facing assembly installed on the bridge assemblies. This exposes the operator to many of the safety hazards previously discussed. The present invention, however, provides for a self-aligning feature that is accomplished prior to installing the module on the bridge assemblies 406, 408. Consequently, any maintenance that must be performed on the module components can be done safely off-line. This is accomplished by use of an aligning handle as illustrated in FIGS. 5 and 6.

FIG. 5 shows one embodiment of the aligning handle 576 installed on a reclose module. FIG. 6 shows the aligning handle 676 without the reclose module attached. The aligning handle 676 is constructed of a rigid material, such as hardened steel, and can be of a contiguous cast design, made up of several major components welded together, or made up of several major components bolted together. Importantly, the aligning handle has two front engaging means 678, 680 and two rear engaging means 682, 684. These engaging means 678, 680, 682, 684 in the embodiment illustrated comprise bolts with knobs at one end, but could be of any suitable design to rigidly attach the handle to modules.

Returning to FIG. 5, when the aligning handle is placed in the proper position in relation to the accompanying module, each of the four engaging means 578, 580, 582, 584 secure the opposed sections of the reclose module by twisting the respective knobs, which in turn causes the bolts 578, 580, 582, 584 to seat in threaded receivers (indicated by dashed lines 486, 488 on FIG. 4b) located in the support members 572, 574. These threaded receivers are located such that the zipper seal facings 540, 542 and jaw facings 502, 504 are aligned once the aligning handle 576 has been properly secured to the reclose module. The entire reclose module can then be carried in one, self-contained package by the aligning handle 576.

To install the reclose module, it is placed in between the bridge assemblies while the sealing carriage is in the open position. The bridge assemblies are then slowly closed such that the installation bolts 560, 562 are directed through the respective bolt and nut wells on the receiving bridge assemblies.

By referring back to FIG. 4b, it can be seen that the front support member 474 is now snugly fitted about the front bridge assembly 408. Although shown apart in FIG. 4b, at this stage the front and rear portions of the module would be held tightly together in an aligned position by the aligning handle. The rear support platform 472 allows for tolerance about the rear bridge assembly 406 in order that this alignment can be maintained while the installation bolts 456, 460 are tightened with standard nuts (not shown). Once the nuts have been tightened on the installation bolts 456, 460, the alignment handle is removed and the alignment of the module is thereafter maintained by the installation bolts 456, 460.

Returning to FIG. 5, also shown is an electrical quick connect plug 594. This electrical quick-connect plug 594 consolidates the wiring to various electrical components in the reclose module, such as the heat probes and thermosters. A receiving female outlet for this quick connect plug 594 can be installed on the modified form and fill machine chassis, thereby accommodating a quick and simple positive connection between the electrical control and inputs of the form and fill machine with the electrical components contained within the reclosed module. Although FIG. 5 shows only one quick-connect plug 594, an alternative embodiment of the reclose module comprises two quick-connect plugs, each with a wire harness directed to electrical components associated with one half of the module. Such a two-plug embodiment would require two separate receiving outlets installed on the chassis of the form and fill machine. Additional electrical controls are added to the form and fill machine to separately control the electrical components associated with the zipper seal facings 540, 542, and would be consolidated in the receiving outlets.

Returning to the installation of the invention's reclose module in a sealing carriage, and comparing FIGS. 3b and 4b, it can be seen that the channels 341, 343, 441, 443 in the jaw facings 302, 304, 402, 404 that are designed to accommodate the knife are no longer in the same position relative to the bridge assemblies 306, 308, 406, 408. The knife is not a component of the embodiment of the reclose module shown in FIG. 4b, but, rather, remains attached to the bridge assembly 406, 408. Consequently, it is necessary to provide another modification to the sealing carriage in order to account for the lower position of the invention's jaw facings 402, 404. This is accomplished by knife adapters 801, 803 illustrated in FIG. 8. When using the knife 822 with the reclose module, the knife adapters 801, 803 reposition the knife 822 relative to the lower positioned jaw facings 402, 404.

Figure 8:
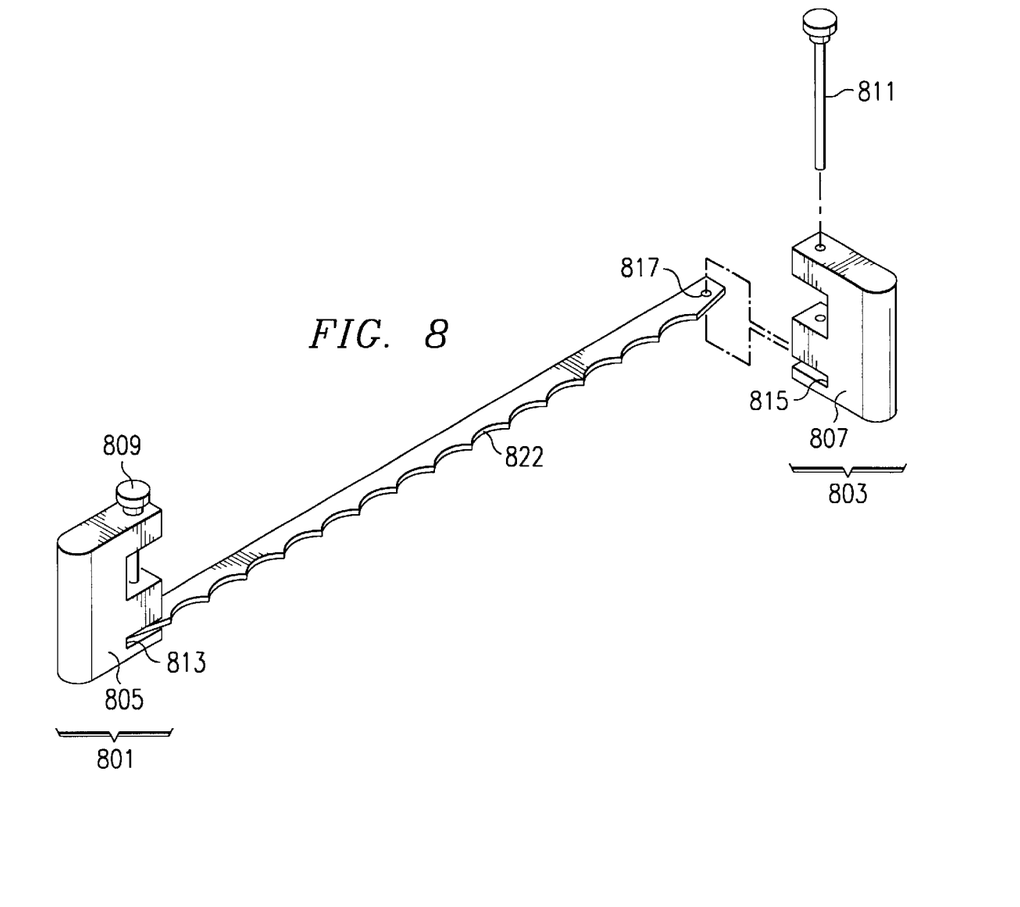
FIG. 8 is a perspective view in elevation of the knife assembly of the present invention.

The knife adapters 801, 803 comprise two extenders 805, 807 and two installation pins 809, 811. The installation pins 809, 811 hold the knife 822 in the knife adapters 801, 803 by positioning the knife 822 in receiving slots 813, 815, and passing the pins 809, 811 through a hole 817 in either end of the knife 822.

The knife 422 is installed on the reclose module as illustrated in FIG. 4a after the reclose module is installed on the bridge assemblies 406, 408, as described above. The sealing carriage is then opened. The extensions 405, 407 are then fitted over the existing knife brackets 424, 426. The knife 422 is inserted into the channel on the rear jaw facing 402. The installation pins 409, 411 are next inserted through holes in the end of each knife bracket 424, 426 and holes at the ends of the knife 422. Likewise, the knife 422 can be removed by reversing the above sequence when the reclose module is removed from the sealing carriage.

The installation of the reclose module is completed once the support member installation bolts have been installed on the bridge assemblies, the knife has been properly positioned and attached with the knife adapters, and the electrical quick-connects have been inserted into the receiving outlets on the form and fill machine chassis. The entire installation process takes a single tool, a standard socket wrench, and takes less than fifteen minutes.

The reclose module is removed by first opening the sealing carriage. The knife and knife adapters are removed and the electrical quick-connects are disconnected from the chassis. The ceiling carriage is then closed. Next, the aligning handle is attached to the support members as previously described. The nuts are then removed from the support member installation bolts. Finally, the sealing carriage is opened and the reclose module is lifted therefrom by the aligning handle.

Figure 7:
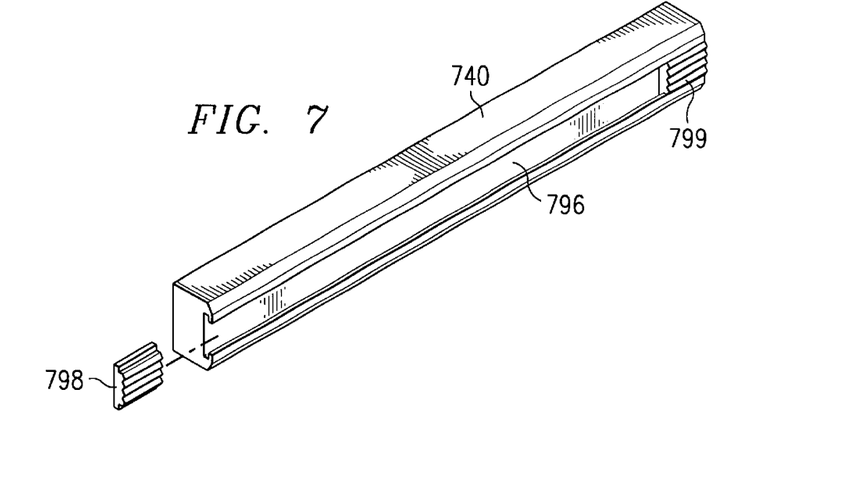
FIG. 7 is a perspective view in elevation of one embodiment of a zipper seal facing of the present invention.

FIG. 7 shows the rear zipper facing 740 for one embodiment of the present invention. This embodiment shows another novel feature of the invention which eliminates the need for the use of a different zipper seal facing for each different bag width run in the reclose configuration. This is accomplished by using a slotted channel 796 in combination with two inserts 798, 799. The inserts 798, 799 slide into and out of the channel, being held in place by the flange configuration of the edges of the channel and/or set screws (not shown). Rather than stocking various sizes of zipper facings having different widths of rectangular relief, different sized inserts 798, 799, used to change the horizontal distance between the two inserts 798, 799, can be kept in stock. Alternatively, a single size set of inserts 798, 799 can be used and simply moved horizontally along the channel 796 in order to adjust for the appropriate bag width. The inserts 798, 799 themselves can have teeth on their exposed contact surface (as shown), have a flat contact surface, or any other appropriate design.

Changing the bag width for a reclose configuration using this feature of the present invention is a relatively simple task. The reclose module is removed from the bridge assembly, as previously described. The operator next removes the reclose module to a work bench or similar area. The aligning handle is removed to allow access to the rear zipper facing 740. Inserts 798, 799 are then removed and replaced with new inserts 798, 799 sized for the bag width to be run. Alternatively, the inserts 798, 799 are repositioned along the channel in order to adjust the distance separating them for the new bag width required. Removal of the entire zipper facing 740 is not required. The reclose module can then be realigned and reinstalled as previously described.

The embodiment of the invention's reclose module illustrated in FIG. 4b shows a rear zipper seal facing 440 with an insert 498 in the slotted channel, while the opposed front zipper seal 442 comprises a flat exposed surface. (This is also evident in FIG. 5.) An alternative embodiment of the invention comprises slotted channels in both the rear zipper facings 440 and the front zipper facings 442.

Figure 9:
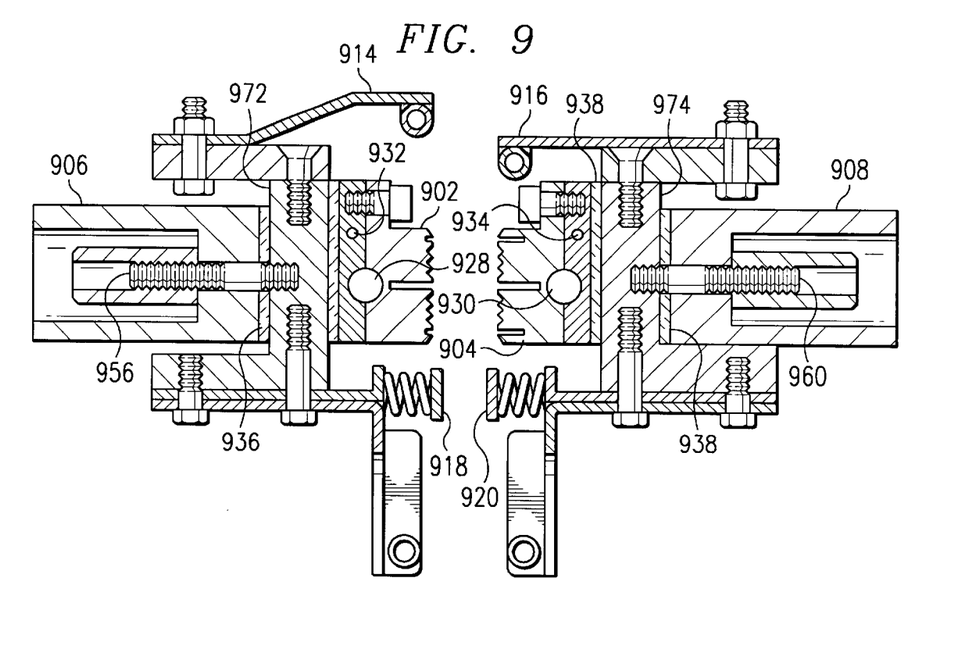
FIG. 9 is a cross-section view of the return module of the present invention.

In order to convert the modified form and fill machine of the present invention back to a standard (no zipper seal facings) configuration, the present invention utilizes what is called a "return" module, which returns the form and fill machine to the standard transverse seal operation. One embodiment of the return module of the present invention is shown in FIG. 9. The return module shown comprises opposed jaw facings 902, 904, support members 972, 974, heat probes 928, 930, thermosters 932, 934, crumb plates 914, 916, stripper bars 918, 920, and thermal barriers 936, 938. The support members 972, 974 are smaller than the support members used in the reclose module, but perform much the same function of maintaining a rigid support base for all of the various components that comprise the return module.

The return module is installed on the bridge assemblies 906, 908 in a manner similar to that previously described with regard to the reclose module. Specifically, it is attached to the bridge assemblies 906, 908 by four bolts 956, 960 connected to the support members 972, 974. Since the jaw facings 902, 904 are in the same relative vertical positions as in a prior art facing assembly, a knife adapter, such as the one shown in FIG. 8, is not required for the return module.

Figure 10:
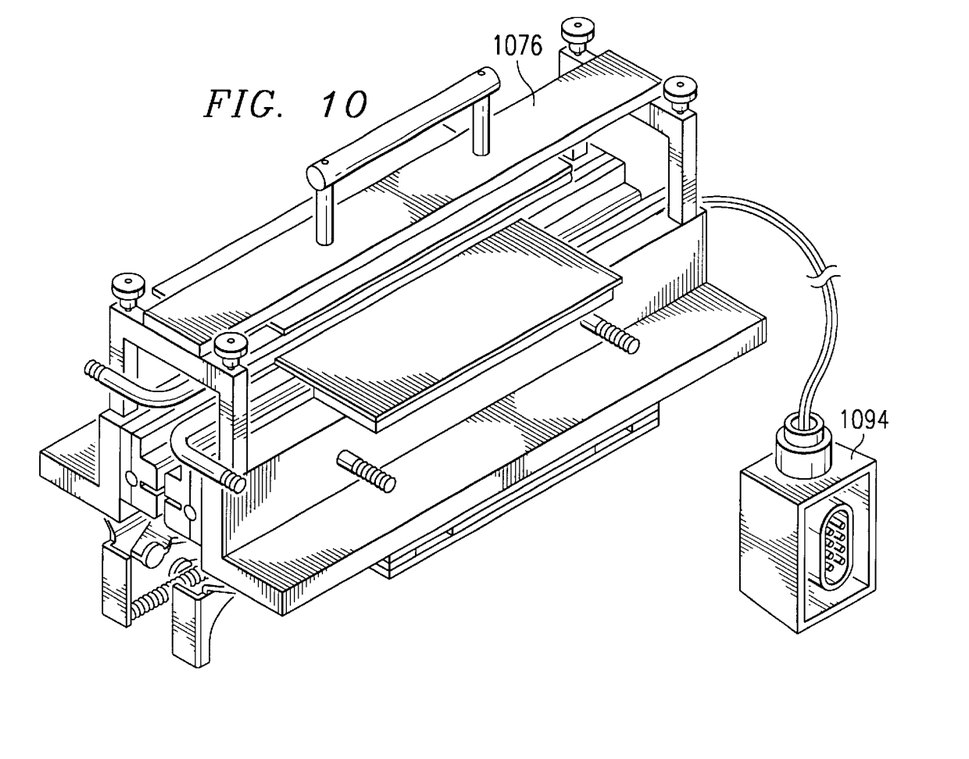
FIG. 10 is a perspective view in elevation of the return module of the present invention with handles.

The return module is aligned, stored, and transported using the invention's aligning handle 676, as is illustrated in FIG. 6. FIG. 10 shows the aligning handle 1076 installed on the return module. As with the reclose module, the return module is also equipped with one or more electrical quick disconnect 1094 electrical connections in order to connect the various electrical components of the return module to the modified form and fill machine controls. The installation of the reclose module is completed after the quick disconnect 1094 is mated with a respective plug on the chassis of the form and fill machine and the aligning handle 1076 is removed. The return module then functions just as the prior art facing assembly described in relation to FIG. 1b.

The return module is easily installed in place of the reclose module on the modified form and fill machine of the present invention. Installation or removal of either module takes less than fifteen minutes, can be accomplished with a single standard socket wrench, and minimizes the operator's exposure to hot components and time spent with digits exposed while the sealing carriage is in the open position.

While the invention has been particularly shown and described with reference to a preferred embodiment, it will be understood by those skilled in the art that various changes in form and detail may be made therein without departing from the spirit and scope of the invention.

What is claimed is:

1. A reclose module for installation on the bridge assemblies of a sealing carriage, said module comprising:
   two support members;
   two opposed zipper seal facings, each attached to a respective support member;
   two opposed jaw facings, each attached to a respective support member; and
   wherein, upon installation of the support members on said bridge assemblies, the zipper seal facings and jaw facings are located approximately equidistant from the axis of the force vectors transmitted from the bridge assemblies to the support members during sealing operations and the jaw facings are below the zipper seal facings, further wherein said reclose module is a single unit that can be installed on and removed from the sealing carriage as a unit.

2. The reclose module of claim 1 further comprising:
   aligning handle attachable to said support members when the module is in a closed position, and wherein such aligning handle retains the comprising elements of claim 1 in relative position and as a single unit in the event the reclose module is removed from the bridge assemblies.

3. The reclose module of claim 1 wherein at least one of the zipper seal facings comprises a slotted channel for receiving end inserts.

4. The reclose module of claim 1 further comprising:
   two crumb plates, each attached to a respective support member.

5. The reclose module of claim 1 further comprising:
   two stripper bars, each attached to a respective support member.

6. The reclose module of claim 1 further comprising:
a heat probe in contact with at least one jaw facing;
a heat probe in contact with at least one zipper seal facing;
wires connected to each of said heat probes; and
at least one electrical quick-connect for connecting said heat probes to controls on a form and fill machine.

7. The reclose module of claim 1 further comprising:
a knife adapter attached to one bridge assembly for orienting a knife to a jaw facing.

8. A reclose module for installation on two opposed bridge assemblies of a form, fill, and seal machine sealing carriage, said reclose module comprising:
two support members, each one removably affixed to a respective bridge assembly;
at least one facing attached to each support member;
at least one heat probe enclosed between said at least one facing and each respective support member; and
an aligning handle attachable to each support member when said facings are placed in proximate contact.

9. The reclose module of claim 8 wherein the support members, heat probes, and facings form a single removable module when the aligning handle is attached to each support member.

10. The reclose module of claim 9 further comprising:
electrical quick-connect means for connecting electrical components of said single removable module to said form and fill machine.

11. The reclose module of claim 8 wherein a jaw facing and a zipper seal facing are attached to each support member.

12. The reclose module of claim 11 wherein each zipper seal facing is positioned above each jaw facing when said reclose module is installed on said opposed bridge assemblies of a form, fill, and seal machine sealing carriage.

13. The reclose module of claim 11 wherein the jaw facings and zipper seal facings are oriented on said support member such that relatively uniform pressure is distributed about all said facings when the sealing carriage presses the opposed facings together.

14. The reclose module of claim 11 wherein at least one zipper seal facing comprises:
a slotted channel for receiving inserts at each end, thereby providing a means for varying the width of the slotted channel.

15. The reclose module of claim 11 further comprising:
a knife adapter for repositioning a knife assembly attached to a bridge assembly relative to one jaw facing.

16. The reclose module of claim 15 wherein said knife adapter comprises:
two extension members attached to a said bridge assembly;
two attaching pins, each insertable through an extension member and knife blade.

17. The reclose module of claim 8 further comprising:
a crumb plate attached to each said support member.

18. The reclose module of claim 8 further comprising:
a stripper bar attached to each said support member.

19. A reclose module for quick installation on the bridge assemblies of a sealing carriage of a form and fill machine, said reclose module comprising
at least one set of opposed facings;
an aligning handle for aligning said opposed facings prior to installation on said sealing carriage; and
a plurality of attaching bolts for securing said at least one set of opposed facings on the bridge assemblies.

20. The reclose module of claim 19 wherein an opposed set of jaw facings is integral with and positioned below an opposed set of zipper seal facings when said reclose module is installed on the bridge assemblies of a sealing carriage of a form and fill machine.

21. The reclose module of claim 20 wherein said jaw facings and zipper seal facings are approximately equidistant from the axis of the closing force vectors acting on said bridge assemblies when the module is installed on said bridge assemblies.

22. The reclose module of claim 20 wherein at least one zipper seal facing comprises a slotted channel and at least two end inserts.

23. The reclose module of claim 19 further comprising at least one heat probe in contact with each jaw facing.

24. The reclose module of claim 23 further comprising at least one electrical quick connect for connecting said heat probes to the form and fill machine electrical controls.

25. The reclose module of claim 19 further comprising:
at least one set of crumb plates connected to said facings.

26. The reclose module of claim 19 further comprising:
at least one set of stripper bars connected to said facings.

27. A reclose module for a vertical form, fill, and seal machine having a pair of bridge assemblies, said reclose module comprising:
two support members, each having at least one threaded receiver for receiving a bolt and each having at least one bolt for mounting said support members on a respective bridge assembly;
a pair of opposed zipper seal facings, each attached to a respective support member;
a pair of opposed jaw facings, each attached to a respective support member; and,
an aligning handle having a plurality of attaching bolts, wherein said attaching bolts are threadable into said threaded receivers when said opposed facings are in proximate contact.

28. The reclose module of claim 27 wherein the pair of opposed zipper seal facings are located above the pair of opposed jaw facings in relation to the vertical form, fill, and seal machine, when the support members are installed on their respective bridge assemblies.

29. The module of claim 27 wherein the opposed zipper seal facings and opposed jaw facings are oriented relative to the bridge assemblies when the support members are attached to said bridge assemblies such that the pressure applied by the bridge assemblies when closing is generally equal between the opposed zipper seal facings and opposed jaw facings.

30. The reclose module of claim 27 further comprising:
at least one heat probe mounted between at least one facing and at least one respective support member.

31. The reclose module of claim 30 further comprising:
electrical wires connected to said at least one heat probe;
an electrical quick-connect plug attached to said wires.

32. The reclose module of claim 27 further comprising:
a pair of crumb plates, each plate attached to a respective support member.

33. The reclose module of claim 27 further comprising:
a pair of stripper bars, each bar attached to a respective support member.

* * * * *